(12) United States Patent
Kinlen

(10) Patent No.: US 7,601,280 B2
(45) Date of Patent: Oct. 13, 2009

(54) CORROSION-RESPONSIVE COATING FORMULATIONS FOR PROTECTION OF METAL SURFACES

(75) Inventor: Patrick J. Kinlen, Fenton, MO (US)

(73) Assignee: Lumimove, Inc. A Missouri Corporation, St. Louis, MO (US)

( * ) Notice: Subject to any disclaimer, the term of this patent is extended or adjusted under 35 U.S.C. 154(b) by 0 days.

(21) Appl. No.: 12/217,699

(22) Filed: Jul. 8, 2008

(65) Prior Publication Data

US 2008/0272341 A1 Nov. 6, 2008

Related U.S. Application Data

(62) Division of application No. 10/454,347, filed on Jun. 4, 2003, now abandoned.

(60) Provisional application No. 60/466,298, filed on Apr. 29, 2003, provisional application No. 60/386,058, filed on Jun. 4, 2002.

(51) Int. Cl.
*H01B 1/00* (2006.01)
*C01B 3/02* (2006.01)
*C23F 11/00* (2006.01)
*C08G 75/00* (2006.01)
*C08G 73/00* (2006.01)

(52) U.S. Cl. .................. 252/500; 252/387; 252/388; 252/394; 252/395; 528/377; 528/422; 528/423

(58) Field of Classification Search ......... 252/387–396, 252/500; 528/377, 422, 423
See application file for complete search history.

(56) References Cited

U.S. PATENT DOCUMENTS

| 3,963,498 A | 6/1976 | Trevoy ........................... 96/87 |
| 4,011,176 A | 3/1977 | Saunders et al. ............. 252/500 |
| 4,025,691 A | 5/1977 | Trevoy ........................ 428/411 |
| 4,025,704 A | 5/1977 | Trevoy ........................ 526/16 |
| 4,051,066 A | 9/1977 | Miksic et al. ................ 252/389 |
| 4,174,980 A | 11/1979 | Howell, Jr. et al. ......... 148/6.14 |

(Continued)

FOREIGN PATENT DOCUMENTS

EP 1382721 * 1/2004

(Continued)

OTHER PUBLICATIONS

International Search Report dated Sep. 25, 2003 for International Application No. PCT/US03/17571.

(Continued)

*Primary Examiner*—Mark Kopec
*Assistant Examiner*—Jaison P Thomas
(74) *Attorney, Agent, or Firm*—Nelson Mullins Riley & Scarborough, LLP

(57) ABSTRACT

Methods and compositions are described for protecting a metal surface against corrosion. The method involves applying to the metal surface a coating formulation that comprises a radiation curable resin and a corrosion-responsive agent that is capable of releasing a corrosion-inhibiting ion in response to exposure to ionic species characteristic of those present on a metal surface undergoing oxidative corrosion; and exposing the coating formulation to radiation whereby the radiation curable resin forms a corrosion-resisting coating having a low spontaneous release rate of the corrosion-responsive agent into the environment.

5 Claims, 4 Drawing Sheets

U.S. PATENT DOCUMENTS

| | | | | |
|---|---|---|---|---|
| 4,321,114 A | 3/1982 | MacDiarmid et al. | ......... | 204/2.1 |
| 4,349,458 A | 9/1982 | Rothgery | ............ | 252/391 |
| 4,373,968 A | 2/1983 | Hess | .................. | 148/6.2 |
| 4,442,187 A | 4/1984 | MacDiarmid et al. | ....... | 429/213 |
| 4,475,957 A | 10/1984 | Sander | ............... | 148/6.16 |
| 4,540,738 A | 9/1985 | Zimmermann | ............. | 524/707 |
| 4,547,270 A | 10/1985 | Naarmann | ................ | 204/58.5 |
| 4,612,049 A | 9/1986 | Berner et al. | ........... | 106/14.13 |
| 4,629,540 A | 12/1986 | Genieès et al. | ............... | 204/59 |
| 4,695,521 A | 9/1987 | Shacklette et al. | ......... | 429/194 |
| 4,698,385 A | 10/1987 | Schindler | .................. | 524/733 |
| 4,728,589 A | 3/1988 | MacDiarmid et al. | ....... | 429/213 |
| 4,798,685 A | 1/1989 | Yaniger | ................. | 252/500 |
| 4,818,777 A | 4/1989 | Braig | ........................ | 524/83 |
| 4,851,487 A | 7/1989 | Yaniger et al. | ............. | 525/540 |
| 4,873,139 A | 10/1989 | Kinosky | .................... | 428/341 |
| 4,904,360 A | 2/1990 | Wilson, Jr. et al. | ....... | 204/181.7 |
| 4,940,517 A | 7/1990 | Wei | ............................ | 204/78 |
| 4,956,441 A | 9/1990 | Kathirgamanthan et al. | . | 528/171 |
| 4,983,322 A | 1/1991 | Elsenbaumer | ............... | 250/500 |
| 5,002,700 A | 3/1991 | Otagawa et al. | ............ | 252/500 |
| 5,110,494 A | 5/1992 | Beck | ......................... | 252/156 |
| 5,438,053 A | 8/1995 | Sendai et al. | .............. | 514/206 |
| 5,441,772 A | 8/1995 | McAndrew et al. | ......... | 427/388 |
| 5,522,981 A | 6/1996 | Lacaze et al. | ............... | 205/317 |
| 5,558,706 A | 9/1996 | Sinko | ......................... | 106/480 |
| 5,567,356 A | 10/1996 | Kinlen | ....................... | 252/500 |
| 5,571,292 A | 11/1996 | Sotomura et al. | ......... | 29/623.5 |
| 5,645,890 A | 7/1997 | MacDiarmid et al. | ....... | 427/302 |
| 5,736,623 A * | 4/1998 | Angelopoulos et al. | ..... | 528/422 |
| 5,863,465 A | 1/1999 | Kinlen | ....................... | 252/500 |
| 5,883,200 A | 3/1999 | Tsuchiya et al. | ............ | 525/517 |
| 5,948,147 A | 9/1999 | Sinko | ..................... | 106/14.05 |
| 6,008,285 A | 12/1999 | Kasemann et al. | ........... | 524/430 |
| 6,010,645 A * | 1/2000 | Angelopoulos et al. | ..... | 252/500 |
| 6,054,514 A | 4/2000 | Kulkarni | .................... | 524/111 |
| 6,099,757 A | 8/2000 | Kulkarni | ..................... | 252/500 |
| 6,139,610 A | 10/2000 | Sinko | ..................... | 106/14.44 |
| 6,150,032 A | 11/2000 | Yang et al. | ................... | 428/457 |
| 6,160,164 A | 12/2000 | Braig et al. | .................. | 562/12 |
| 6,211,262 B1 | 4/2001 | Mejiritski et al. | ............. | 522/71 |
| 6,340,539 B1 | 1/2002 | Yamaguchi et al. | ......... | 429/213 |
| 6,380,346 B1 | 4/2002 | Han | .......................... | 528/210 |
| 6,399,548 B1 | 6/2002 | Vartanian et al. | ............ | 508/273 |
| 6,447,594 B1 | 9/2002 | Sinko et al. | ................. | 106/453 |

FOREIGN PATENT DOCUMENTS

| | | |
|---|---|---|
| GB | 1 494 212 | 12/1977 |
| GB | 2 187 466 A | 5/1985 |
| GB | 2 210 044 A | 6/1989 |
| WO | WO 90/10095 | 9/1990 |

OTHER PUBLICATIONS

Article from Progress in Organic Coatings. May 2001; 42: pp. 267-282 by J. Sinko entitled *Challenges of Chromate Inhibitor Pigments Replacement in Organic Coatings*.

Article from Journal of The Electrochemical Society. Jun. 2002; 149 (7): pp. A939-A-952 by J. Pope et al. entitled *Organosulfur/Conducting Polymer Composite Cathodes II. Spectroscopic Determination of the Protonation and Oxidation States of 2,5-Dimercapto-1,3,4-thiadiazole*.

Book by Jean-Pierre Fouassier entitled *Photoinitiaion, Photopolymerization, and Photocuring Fundamentals and Applications*, Hanser/Gardner Publications, Inc., 1995; pp. 1-7; 147-330.

Article from UV Curable Gel Polymer Electrolytes. 2002; vol. 23, No. 5: pp. 683-687 by Bookeun Oh et al. entitled *Preparation of UV Curable Gel Polymer Electrolytes and Their Electrochemical Properties*.

Book by Fulvio Vara, et al. entitled *UV/EB Curing Primer: Inks, Coatings and Adhesives*, RadTech International North America, Jan. 1995; pp. 1-17; 60-69.

\* cited by examiner

CORROSION-RESPONSIVE COATING FORMULATIONS FOR PROTECTION OF METAL SURFACES

CROSS REFERENCE TO RELATED PATENTS AND PATENT APPLICATIONS

The present application is a divisional of U.S. Non-Provisional patent application Ser. No. 10/454,347, filed Jun. 4, 2003, which claims priority to U.S. Provisional Patent Application Ser. No. 60/386,058, filed Jun. 4, 2002, and to U.S. Provisional Application Ser. No. 60/466,298, filed Apr. 29, 2003, each of which is incorporated herein by reference in its entirety.

BACKGROUND OF THE INVENTION (1) Field of the Invention

The present invention relates to coatings for metal surfaces that protect the surfaces from corrosion, and more particularly to radiation curable corrosion-responsive coatings for metals and components of such coatings.

(2) Description of the Related Art

In the United States approximately $300 billion per year in direct costs is lost due to metallic corrosion. More than one third of costs are considered avoidable using existing know-how and technology. Coatings are the primary and most economical means for controlling the corrosion of metals. The key factors that influence corrosion are the type of metal being used (aluminum, steel, copper, etc.) and the environment to which the metal is exposed (pH, temperature, humidity, chemicals, etc.).

Current strategies for corrosion protection include: dispersion of pigments in coating systems which act as passivating agents, including strontium chromate, zinc chromate, zinc phosphate, barium metaborate, etc.; dispersion of pigments in coating systems which provide cathodic protection (e.g., zinc dust which acts as a sacrificial anode); and the provision of mechanical protection by applying thick multilayer coating systems such as epoxies, urethanes, acrylics and rubbers, which are impervious to moisture and chemical ingress. What is lacking with current coating strategies, however, is an environmentally friendly coating system that prevents corrosion and pitting even in the presence of pinholes or scratches.

Problems with a passivation coating, such as chromium VI (the form of chromium commonly used in aerospace coatings), include the fact that chromium is a carcinogen and federal, state and local agencies have issued regulations that limit or prohibit the use of chromated materials. OSHA regulates the amount of hexavalent chromium to which workers can be exposed, and has proposed reducing the Permissible Exposure Limit (PEL) from the current 50 micrograms/$m^3$ to less than 1 microgram/$m^3$. OSHA's proposed PEL would severely impact the use of hexavalent chromium throughout the aerospace sector.

The primary function of barrier coatings is to prevent the ingress of water and salts. However, such coatings often lack pinhole protection. Any pitting or scarring that penetrates the underlying structures can lead to catastrophic corrosion damage. To compensate for the lack of pinhole protection, multiple layers are applied.

Sacrificial coatings are designed to corrode and cathodically protect the underlying structure. These coatings wear more readily, and the layer thickness and its associated weight can negatively impact structural design.

Epoxy primers containing chromate with polyurethane top coats are widely used for corrosion protection in the aircraft industry. Strontium chromate coatings, while extremely effective, are under significant pressure to be eliminated because of their carcinogenic classification. In addition, chromic acid anodizing and other chromium conversion coating systems are also commonly employed to enhance corrosion protection and also adhesion of the epoxy primer coating to aluminum.

The need for anti-corrosion coatings, which are pinhole and scratch tolerant, coupled with growing environmental concerns involving heavy metals, such as hexavalent chromium, has led to new coating strategies. In one area, coatings that employ intrinsically conductive polymers (ICPs) have been reported. The first documented observations of corrosion protection of steel by polyaniline were reported in 1981 by Mengoli, et al., *Appl Polymer Sci.*, 26:4247 (1981). Since then, numerous papers have been published on the corrosion protection of carbon steel (Kinlen, et al., *Corrision*, 58:490 (2002)), stainless steel (Casparac et al, *J. Electrodhem. Soc.*, 148:B138 (2001)), iron (Beck, *Metalloberflacche*, 46:177 (1992); and Beck, et al., *Electrochimica Acta*, 39:229 (1994)), titanium, copper (Brusic, et al., *J. Electrochem. Soc.*, 144:436 (1997), and aluminum alloys (Gelling, et al., *Prog. Organic Coatings*, 43:149 (2001)), with ICP's. Two comprehensive review articles have been published. See, e.g., McAndrew, *Trends in Polymer Science*, 5:7 (1997); and Spinks, et al., *J. Solid State Electrochemistry*, 6:85 (2002).

Other work has led to the use of "smart" coatings, which contain materials designed to release a corrosion-inhibiting species on demand during corrosion. For example, in WO 90/10095, Wallace reports a polymer coating, where the polymer is preferably an electrically conductive oligomer, such as polypyrrole, that contains ions such as chromate, EDTA, and others, which are released in response to contact with ionic species that are the product of the oxidative/reductive chemical reactions that occur during corrosion. In U.S. Patent Publication 2002/0197468A1, Sinko identifies corrosion-inhibiting organic pigments, such as 2,5-dimercapto-1,3,4-thiadiazole (DMTD), and others, that demonstrate "throw power" (an ability to maintain a scribed line on a coated metal surface free of corrosion in a corrosive environment). In U.S. Pat. No. 6,139,610, Sinko describes certain inorganic and organic pigment compositions as being effective corrosion inhibitors, again with DMTD being mentioned. In another publication, Sinko identified certain inorganic materials as being potential replacements for chromates. Sinko, J., *Prog. in Org. Coatings*, 42:267-282 (2001).

Although epoxy-based coatings predominate in commercial corrosion prevention applications, other polymeric systems are suggested. One drawback of many polymeric systems, however, is the use of solvents, or the formation of water or gas during curing. The removal of the solvents, water, or gas from the coating as it cures leaves holes, pits, and voids in the cured film, through which water, oxygen and other corrosive elements can penetrate to reach the metal surface.

Radiation-curable polymer systems, such as UV-curable resins, can be formulated to be solvent-free, and have been used to form films that contain various chemicals. Kim, Y-B, et al., *Polymers for Advanced Technologies*, 13(7):522-526 (2002), have reported UV cured transparent films containing conductive microgels coated with polyaminiline/dodecyl-benzenesulphonic acid (DBSA). Others have reported the corrosion-protective effects for aluminum of polymeric blend coatings containing either polyaniline, polypyrrole, or other polymers, and UV-curable urethane acrylate binders. Vang, C. et al., *Polymer Preprints*, 43 (1), Spring 2002, Papers presented at the ACS meeting held Orlando, Fla., Apr. 7-11, 2002, ACS Div. of Polymer Chemistry. In Japanese unexamined patent JP 11/172,103, aniline-type resin compositions are cured with UV radiation. The polyaniline in the cured films is doped with a sulphone compound, and the film is reportedly useful as an antistatic agent.

Despite the availability of radiation-cured polymeric systems, they have not been widely used to form corrosion-resisting coatings, and certain problems remain to be resolved. It is known, for example, that the corrosion-inhibiting compound DMTD is itself a strong UV absorber. It is unclear, therefore, whether such a material could be included as a component in a UV-cured resin system at a level that would be useful for corrosion inhibition without interfering with the curing of the coating.

Accordingly, therefore, it would be useful to provide corrosion-inhibiting methods and compositions that provided effective corrosion protection for metal surfaces. It would also be useful if such methods and compositions supplied corrosion-inhibiting agents in response to actual corrosion on a metal surface, and if they provided corrosion protection for pinholes and scratches that might occur on the metal surfaces. It would also be useful if such methods and compositions retained their effectiveness through normal weather exposure.

SUMMARY OF THE INVENTION

Briefly, therefore the present invention is directed to a novel method of protecting a metal surface against corrosion, the method comprising:

applying to the metal surface a coating formulation that comprises a radiation curable resin and a corrosion-responsive agent that is capable of releasing a corrosion-inhibiting ion in response to exposure to electrochemical conditions characteristic of those present on a metal surface undergoing oxidative corrosion; and exposing the coating formulation to radiation whereby the radiation curable resin forms a corrosion-resisting coating having a low spontaneous release rate of the corrosion-responsive agent into the environment.

The present invention is also directed to a novel anti-corrosion coating formulation comprising a radiation curable resin and a corrosion-responsive agent that is capable of releasing a corrosion-inhibiting ion in response to exposure to electrochemical conditions characteristic of those present on a metal surface undergoing oxidative corrosion.

The present invention is also directed to a novel corrosion resisting coating for a metal surface, the coating comprising a corrosion-responsive agent dispersed in a radiation cured crosslinked polymer matrix.

The present invention is also directed to a novel metal surface protected against corrosion comprising:

a metal surface; to which is adhered, a radiation-cured polymer matrix that has been formed according to any one of the methods described herein.

The present invention is also directed to a novel method of producing an intrinsically conductive polymer salt of a corrosion-responsive agent, the method comprising:

subjecting a liquid mixture containing a corrosion-responsive agent to high-shear mixing to separate the corrosion-responsive agent into very fine particles;

adding a monomer of an intrinsically conductive polymer to the mixture of fine corrosion-responsive agent particles while subjecting the mixture to high-shear mixing;

adding an oxidant to the mixture to facilitate polymerization of the monomer of the intrinsically conductive polymer into an intrinsically conductive polymer which is doped by the corrosion-responsive agent to form the ICP/CRA salt; and recovering the ICP/CRA salt.

Among the several advantages found to be achieved by the present invention, therefore, may be noted the provision of corrosion-inhibiting methods and compositions that provided effective corrosion protection for metal surfaces; and also the provision of such methods and compositions that supply corrosion-inhibiting agents in response to actual corrosion on a metal surface; and also the provision of such methods and compositions that provide corrosion protection for pinholes and scratches that might occur on the metal surfaces; and also the provision of such methods and compositions that retain their effectiveness through normal weather exposure.

DETAILED DESCRIPTION OF THE PREFERRED EMBODIMENTS

Figure 1:
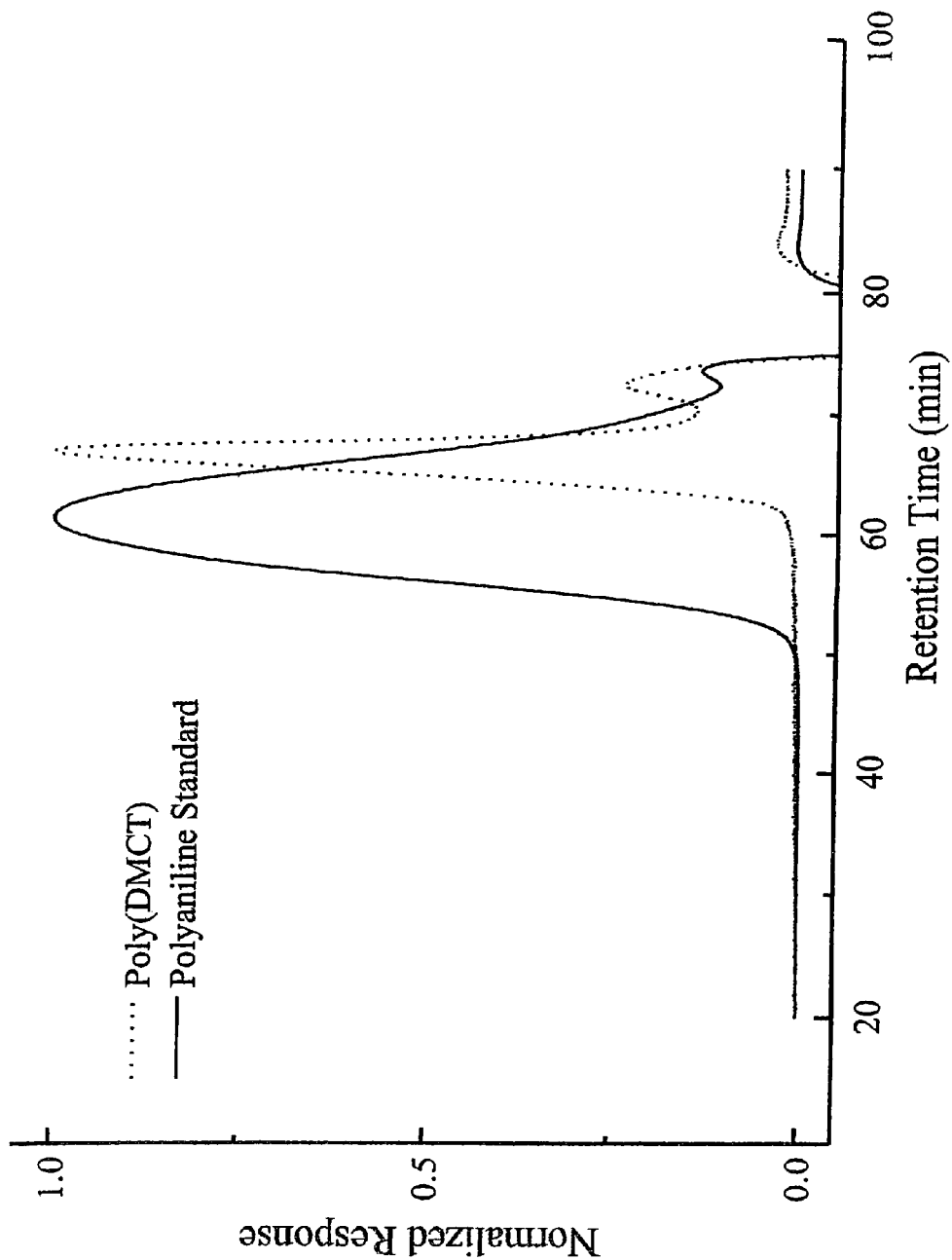
FIG. 1 shows differential refractive index (DRI) chromatograms for a polyaniline standard and a soluble fraction of polymerized 2,5-dimercapto-1,3,4-thiadiazole (poly-DMcT)

In accordance with the present invention, it has been discovered that metal surfaces that are subject to environmental corrosion, in particular to oxidative corrosion, can be protected against such corrosion by applying to the metal surface a coating formulation that comprises a radiation curable resin and a corrosion-responsive agent. The corrosion-responsive agent, which is described in detail below, is a compound that is capable of releasing a corrosion-inhibiting ion in response to exposure to electrochemical (oxidation/reduction) conditions characteristic of those present on a metal surface undergoing oxidative corrosion. After the coating formulation is applied to the metal surface, it is exposed to radiation in a manner that causes the radiation curable resin to form a corrosion-resisting coating having a low spontaneous release rate of the corrosion-responsive agent into the environment.

In a particularly useful embodiment, it has been found that some corrosion-responsive agents oxidatively dimerize or polymerize under the same conditions as are used to cure the resin to form homodimers, homopolymers, or copolymers with a component of the radiation curable resin. These dimerized or polymerized agents reductively depolymerize under corrosion conditions to release corrosion-inhibiting ions.

Coatings formed with these types of agents are exceptionally weatherable and surprisingly effective for corrosion inhibition.

The novel method offers several advantages over anti-corrosion coatings of the prior art. The present compositions provide useful amounts of corrosion-inhibiting ions, or compounds that can form such ions, and act as reservoirs of corrosion-inhibiting ions. The compositions permit the formation of "smart" coatings, in that they release corrosion-inhibiting ions in response to the presence of electrochemical conditions that are typical of the oxidative/reductive conditions present on a metal surface when that surface is undergoing oxidative corrosion. Another advantage of the present method and present coatings is that the corrosion-inhibiting ions are not easily leached out of the novel coatings by exposure of the coatings to normal environmental conditions, such as to rain, water immersion, or the like. In other words, they have a low spontaneous release rate of the corrosion-inhibiting ions. The gives the present coatings a long service life, and permits their use in applications that require long outdoor exposure.

It is believed that a combination of two factors enable the present invention to release corrosion-inhibiting ions in response to corrosion while maintaining a low spontaneous release rate for the ions. One factor is the formation of a coating wherein the corrosion-inhibiting ions are supplied by a corrosion-responsive agent.

In the present invention, a "corrosion-responsive agent" is a compound that is capable of releasing a corrosion-inhibiting ion upon exposure to electrochemical (oxidation/reduction) conditions characteristic of those present on a metal surface undergoing oxidative corrosion. As is well known to those skilled in the study of metal corrosion, oxidative corrosion of a metal by contact with oxygen and water causes the formation of an electrogalvanic cell that is characterized by the presence of metal cations, hydroxyl anions, and the like. When the corrosion-responsive agent of the present invention is in operative contact with such a corroding metal surface, it is believed to react with one or more of the anions or cations that are a part of the oxidative corrosion electrogalvanic cell to produce a corrosion-inhibiting ion. Therefore, the corrosion-responsive agent itself undergoes oxidation or reduction in response to its exposure to the corrosion. However, under non-corrosive conditions, the corrosion-responsive agent remains unreacted and stable, and has a low rate of spontaneous ionization to release a corrosion-inhibiting ion.

Another factor that enhances the benefits of the corrosion-responsive agent in the present invention is the dispersion of the corrosion-responsive agent in a radiation curable coating. It is believed that the present radiation curable coating is a durable coating having very low porosity, which acts as a barrier coating to the penetration of water and oxygen to the metal surface and also modulates, or "throttles", the movement of the corrosion-inhibiting ions that are released by the corrosion-responsive agent.

In the present invention the corrosion-inhibiting ion can be a corrosion-inhibiting cation or a corrosion-inhibiting anion.

When the corrosion-inhibiting ion is a cation, it can be an inorganic cation or an organic cation. Examples of inorganic cations that can act as the corrosion-inhibiting ion of the present invention include ions selected from the group consisting of: Ca, Sr, Ti, Mo, Zr, Ce, and Fe. Examples of organic cations that can act as the corrosion-inhibiting ion of the present invention include ions selected from the group consisting of: ammonium, alkyl-ammonium, and cycloalkyl-ammonium.

When the corrosion-inhibiting ion is an anion, it can be an inorganic anion or an organic anion. Examples of inorganic cations that can act as the corrosion-inhibiting ion of the present invention include an anion that is selected from the group consisting of: $CrO_4^{2-}$, $CrO_{12}H_8^{5-}$, $PO_4^{3-}$, $HPO_4^{3-}$, $MoO_4^{2-}$, $BO_2^{2-}$, $SiO_3^{2-}$, $NCN^{2-}$, $HPO_3^{2-}$, $NO^{2-}$, $P_3O_{10}^{5-}$; and $CO_3^{2-}$. In preferred embodiments, the inorganic corrosion-inhibiting anion can be selected from the group consisting of: $PO_4^{3-}$, $HPO_4^{3-}$, $MoO_4^{2-}$, $BO_2^{2-}$, $SiO_3^{2-}$, $NCN^{2-}$, and $P_3O_{10}^{5-}$.

The corrosion-inhibiting anion of the present invention can be an organic anion. In an embodiment, the organic corrosion-inhibiting anion is one that is formed by the ionization of a corrosion-responsive agent that is selected from the group consisting of mercapto-substituted organics, thio-substituted organics, and dimers, trimers, oligomers, and polymers thereof. Examples of useful mercapto-substituted organic corrosion-responsive agents include a mercapto-substituted aryl or heteroaryl. A particularly useful mercapto-substituted organic corrosion-inhibiting agent is 2,5-dimercapto-1,3,4-thiadiazole.

In another embodiment, the corrosion-inhibiting anion is one that is formed by the ionization of a corrosion-responsive agent that is selected from the group consisting of: 1-(4-hydroxyphenyl)-1H-tetrazol-5-thiol, 1,2,4-triazole-3-thiol, 1-pyrollidinecarbodithioic acid, 2,2'-dithiobis(benzothiazole), 2,4-dimercapto-6-amino-5-triazine, 2,4-dithiohydantoin, 2,5-dimercapto-1,3,4-thiodiazole, 2,5-dimethylbenzothiazole, 2-amino-1,3,4-thiadiazole, 2-mercapto-5-methylbenzimidazole, 2-mercapto-5-nitrobenzimidazole, 2-mercaptobenzimidizole, 2-mercaptobenzoxazole, 2-mercaptoethane sulfonic acid, 2-mercaptoimidazole, 2-mercaptothiazoline, 2-thiouracil, 3-amino-5-mercapto-1,2,4-triazole, 5,5-dithio-bis(1,3,4-thiadiazole-2(3H)-thione, 5-amino-1,3,4-thiadiazole, 6-amino-2-mercaptobenzothiazole, 6-ethoxy-2-mercaptobenzothiazole, 6-mercaptopurine, -alky- or N-cycloalkyl-dithiocarbamates, alkyl- and cycloalkyl mercaptanes, benzothiazole, dimercapto pyridine, dimethyldithio carbamic acid, dithiocyanuric acid, mercaptobenzothiazole, mercaptobenzoxazole, mercaptoethanesulfonic acid, mercaptoimidazole, mercaptopyridine, mercaptopyrimidine, mercaptoquinoline, mercaptothiazole, mercaptothiazoline, mercaptotriazole, O,O-dialkyl- and O,O-dicycloalkyl-dithiophosphates, O-alkyl- or O-cycloalkyl-dithiocarbonates, o-ethylxanthic acid, quinoxaline-2,3-thiol, thioacetic acid, thiocresol, thiosalicylic acid, trithiocyanuric acid, and dimers, trimers, oligomers, and polymers thereof.

The organic corrosion-inhibiting agent can be an organic phosphonic acid or salt or ester thereof. Organic phosphonic acids can be mono-, di-, tri-, tetra-, or polyphosphonic acids. Phosphonic acids that are di-, tri-, tetra-, or poly-phosphonic acids (which may be termed "polyphosphonic acids herein) are preferred for use in the present invention. Other acidic groups, such as carboxylic, boric, and the like, can also be present on the molecule in addition to the phosphonic acid groups. Polymers that have at least two pendent phosphonic acid groups, wherein each such pendent phosphonic acid group is a mono-functional phosphonic acid group, are also included as polyphosphonic acids.

A preferred form of phosphonic acids are aminoalkylphosphonic acids and hydroxyalkylphosphonic acids having the general formula:

$$R^1\text{---}(CH_2\text{---}(PO_3)M_2)_x, \text{ or}$$

$$R^1\text{---}((PO_3)M_2)_x$$

where:
M is selected from the group consisting of hydrogen, an alkaline metal, alkyl, alkenyl, alkynyl, alkoxy, aryl, cyclic, heteroaryl, and heterocyclic;
$R_1$ is selected from the group consisting of amino, aminoalkyl, and hydroxyalkyl; and
x is a number equal to the valence of $R^1$, provided that x is 1 or higher.

In a more preferred embodiment, x is 2 or higher.

Illustrative of some of the organic phosphonic acids that are useful in the present invention are: n-octyldecylaminobismethylenephosphonic acid, dodecyldiphosphonic acid, ethylidenediaminotetramethylenephosphonic acid, hydroxyethylidenediphosphonic acid, 1-hydroxyethylidene, 1,1-diphosphonic acid, isopropenyldiphosphonic acid, N,N-dipropynoxymethylaminotrimethylphosphonic acid, oxyethylidenediphosphonic acid, 2-carboxyethylphosphonic acid, N,N-bis(ethynoxymethyl)aminomethyltriphosphonic acid, nitriletrimethylenephosphonic acid, aminotrimethylenephosphonic acid, diethylenetriaminepentakis(methylenephosphonic) acid, amino(trimethylenephosphonic acid), nitrilotris(methylenephosphonic acid), ethylenediaminotetra (methylenephosphonic acid), hexamethylenediaminetetra (methylenephosphonic acid), diethylenetriaminepenta(methylenephosphonic acid), glycine, N,N-bis (methylenephosphonic acid), bis (hexamethylenetriaminepenta(methylenephosphonic acid), and 2-ethylhexylphosphonic acid.

Suitable organic phosphonates that are useful in the present invention also include alkali metal ethane 1-hydroxy diphosphonates (HEDP), alkylene poly(alkylene phosphonate), as well as amino phosphonate compounds, including amino aminotri(methylene phosphonic acid) (ATMP), nitrilo trimethylene phosphonates (NTP), ethylene diamine tetra methylene phosphonates, and diethylene triamine penta methylene phosphonates (DTPMP). The phosphonate compounds may be present either in their acid form or as salts of different cations on some or all of their acid functionalities. Preferred phosphonates to be used herein are diethylene triamine penta methylene phosphonate (DTPMP) and ethane 1-hydroxy diphosphonate (HEDP). Such phosphonates are commercially available from Monsanto under the trade name DEQUEST®.

In an embodiment of the present invention the corrosion-responsive agent is the salt of an intrinsically conductive polymer and a corrosion-inhibiting anion that is selected from any of the corrosion-inhibiting anions described above.

The terms "intrinsically conductive polymer", or "ICP", as used herein, are intended to include any polymer that, in at least one valence state, has an electrical conductivity greater than about $10^{-8}$ S/cm, and preferably greater than about $10^{-6}$ S/cm. ICP's generally have polyconjugated π-electron systems and can be doped with an ionic dopant species to an electrically conductive state. A number of conjugated organic polymers that are suitable for this purpose are known in the art and include, for example, polyacetylene, polyaniline, polycarbazole, polyfuran, polyisothionaphene, poiyparaphenylene, polyparaphenylene sulfide, polyparaphenylene vinylene, polyperinaphthalene, polyphthalocyanine, polypyrrole, polyquinoline, and polythiophenepolyheteroarylenevinylene, in which the heteroarylene group is thiophene, furan or pyrrole. Mixtures of such ICPs can also be used.

It is known that ICP's, and specifically polyaniline, polythiophene, and polypyrrole, may be made electrically conductive either by electrochemical or chemical polymerization of protonated monomers, or by protonation of the neutral polymer by exposure to protonic acids (often called dopants).

For example, polyaniline that is electrically conductive in its doped, or salt, form typically has a conductivity of greater than about $10^{-8}$ S/cm. However, in its neutral, or base form, it is non-conductive and has a conductivity of less than about $10^{-8}$ S/cm.

In general, polyanilines suitable for use in this invention are homopolymers and copolymers derived from the polymerization of unsubstituted or substituted anilines of Formula I:

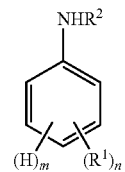

wherein:
n is an integer from 0 to about 2;
m is an integer from 2 to 5, with the proviso that the sum of n and m is equal to 5;
$R^1$ is aryl, alkyl or alkoxy having from 1 to about 30 carbon atoms, cyano, halo, acid functional groups, such as sulfonic acid, carboxylic acid, phosphonic acid, phosphoric acid, phosphinic acid, boric acid, sulfonic acid and the derivative thereof, such as salts, esters, and the like; amino, alkylamino, dialkylamino, arylamino, hydroxy, diarylamino, alkylarylamino, or alkyl, aryl or alkoxy substituted with one or more acid functional groups, such as sulfonic acid, carboxylic acid, phosphonic acid, phosphoric acid, phosphinic acid, boric acid, sulfonic acid and the derivative thereof, such as salts, esters, and the like; dialkylamino, arylamino, diarylamino, alkylarylamino, hydroxy, alkoxy, alkyl, and $R^2$ is the same or different at each occurrence and is an $R^1$ substituent or hydrogen.

By way of example, polyanilines that are suitable for use in the present invention include those that are described in U.S. Pat. Nos. 4,851,487, 4,904,553, 4,935,163, 4,940,517, 5,008,041, 5,095,076, 5,256,730, 5,281,363, 5,378,403, 5,403,913, 5,427,715, 5,532,025, 5,554,717, 5,567,356, 5,585,040, 5,658,649, 5,670,607, 5,773,568, 5,863,465, 5,911,930, 5,917,693, and 6,030,550.

By way of example, polythiophenes that are suitable for use in the present invention include those that are described in U.S. Pat. Nos. 4,986,886, 5,158,707, 5,182,050, 5,204,423, 5,334,292, 5,482,655, 5,691,062, 5,885,711, 6,004,483, 6,242,561, 6,248,818, and 6,333,145.

By way of example, polypyrroles that are suitable for use in the present invention include those that are described in U.S. Pat. Nos. 4,569,734, 4,585,695, 4,617,353, 4,697,000, 4,697,001, 4,764,573, 4,795,687, 4,847,115, 5,120,807, 5,202,060, 5,407,699, 5,522,981, 5,532,025, 5,885,711, and WO 90/10095.

Examples of ICP's that are useful in the present invention include polyacetylenes, polyanilines, polycarbazoles, polyfurans, polyisothionaphenes, polyparaphenylenes, polyparaphenylene sulfides, polyparaphenylene vinylenes, polyperinaphthalenes, polyphthalocyanines, polypyrroles, polyquinolines, and polythiophenepolyheteroarylenevinylenes, in which the heteroarylene group is thiophene, furan or pyrrole, and mixtures thereof.

As mentioned above, when an ICP is a part of the corrosion-responsive agent of the present invention, the ICP is doped with a corrosion-inhibiting anion. In a preferred embodiment the corrosion-responsive agent comprises 2,5-dimercapto-1,3,4-thiadiazole, and the intrinsically conductive polymer is selected from the group consisting of polyaniline, polypyrrole, and polythiophene.

When it is desired to use an ICP doped with a corrosion-responsive agent (CRA) in the present invention, the ICP/CRA salt can be prepared by any of the several methods that are well known in the art. For example, polyaniline may be synthesized by chemical polymerization of the ICP-monomer, aniline, from aqueous solutions or mixed aqueous and organic solutions, or by electrochemical polymerization in solutions or emulsions, and then doped with the CRA. It is preferred, however, that the salt of an ICP and a CRA for use in the present invention be produced:

(a) subjecting a liquid mixture containing a CRA to high-shear mixing to separate the corrosion-responsive agent into very fine particles (i.e., less than about 20 microns number average particle diameter, preferably less than about 10 microns, more preferably less than about 2 microns. As an example, the liquid can be water and the CRA can be DMcT. The high-shear mixing can be carried out, for example, by the use of a high-speed bead mill, such as an Eiger mill. The use of a conventional blender, such as a Waring blender, for example, is insufficient to provide the high-shear mixing required in the preferred embodiment of this method);

(b) adding an ICP monomer, such as aniline, for example, to the mixture of fine CRA particles while subjecting the mixture to high-shear mixing;

(c) adding an oxidant, such as a chemical oxidant, as, for example, ammonium peroxidisulfate, or the imposition of an electrical field, to the mixture to facilitate polymerization of the ICP monomer into an ICP, which is doped by the CRA to form the ICP/CRA salt; and (d) recovering the ICP salt of the corrosion-responsive agent for use in the invention. The ICP/CRA salt can be recovered from the liquid medium by filtration, for example, or be centrifugation, sedimentation, or any other type of solid/liquid separation technique.

The method described above is notable in that no acid, other than the corrosion-responsive agent, is used during the production of the ICP salt of the corrosion-responsive agent. Although it is possible to carry out the polymerization step in the presence of an acid other than the corrosion-responsive agent (a non-corrosion-responsive agent acid, or non-CRA acid), the presence of too much of the other acid is believed to compete with the corrosion-responsive agent for the doping sites on the ICP, with the result being that the ICP is doped predominantly with the non-CRA acid, rather than with the corrosion-responsive agent, and the CRA is left unbound in the product and is susceptible to rapid leaching.

A preferred method of making an ICP doped with a CRA comprises polymerizing the ICP monomer in the presence of a CRA and optionally one or more non-CRA acids, wherein the molar ratio of total acids to the CRA is lower than 8:1. It is more preferred that the ratio of total acids to CRA is lower than 6:1 on a molar basis, even more preferred is when the ratio of total acids to CRA is lower than 3:1 on a molar basis, yet more preferred is a ratio of total acids to dopant inhibitor that is lower than 2:1 on a molar basis, and it is even more preferred that the mixture in which the ICP monomer is polymerized is free of an acid other than the CRA.

Polymerizable corrosion-responsive agents are preferred for use in some embodiments of the present method and compositions. As used herein, the terms "polymerizable corrosion-responsive agents" refer to compounds that are capable of forming homodimers, homopolymers, and/or copolymers with a component of the radiation curable resin under the same conditions that are used to cure the coating formulation, but de-polymerize to release corrosion-inhibiting ions when exposed to electrochemical conditions characteristic of oxidative corrosion on a metal surface.

Examples of such polymerizable corrosion-responsive agents include mercaptothiadiazoles and dimercaptothiadiazoles. When mercaptothiadiazoles are exposed to radiation suitable for curing a radiation curable resin in the presence of a photoinitiator, it is believed that the free radicals generated by the photoinitiator are absorbed by the mercaptothiadiazole as well as by the components of the radiation curable resin with the result that dimers of mercaptothiadiazole are oxidatively formed at the same time that the radiation curable resin polymerizes and crosslinks. In like fashion, when dimercaptothiadiazoles are exposed to such radiation in a radiation curable resin system, it is believed that the dimercaptothiadiazole absorbs free radicals and forms homodimers, homopolymers and/or copolymers with a component of the resin system. Because the free radicals are being absorbed by both the resin and the polymerizable corrosion-responsive agent, it appears that the resin is more difficult to cure than the same system without the agent, when, in fact, the available free radicals are causing the formation of the resin matrix and also the dimers, polymers and co-polymers involving the corrosion-responsive agent. A preferred polymerizable corrosion-responsive agent is 2,5-dimercapto-1,3,4-thiadiazole.

It is believed that advantages of corrosion-inhibiting coatings of the present invention that contain homodimers, homopolymers, and/or copolymers of polymerizable corrosion-responsive agents include the fact that such dimers and polymers act as concentrated reservoirs of the corrosion-responsive agent in a form that have very low rates of mass transfer through the coating matrix. Therefore, the polymerizable corrosion-responsive agents provide coatings having very low spontaneous release rates for the corrosion-responsive agents and a high degree of weatherability.

Like other corrosion-responsive agents, dimerized or polymerized corrosion-responsive agents release corrosion-inhibiting ions when exposed to electrochemical (oxidation/reduction) conditions characteristic of those present on a metal surface that is undergoing oxidative corrosion. In the case of polymerized corrosion-responsive agents, It is believed that the mechanism of release of the ions is due to their reductive depolymerization.

In the present method, the corrosion-responsive agent is intermixed with a radiation curable resin to form a coating formulation. In preferred embodiments, the resin is a liquid at room temperature, and the coating formulation is also a liquid at room temperature. The coating formulation can be applied to a metal surface to form a film of the coating formulation on the metal surface. The coating formulation can then be exposed to radiation whereby the radiation curable resin forms a corrosion-resisting coating having a low spontaneous release rate of the corrosion-responsive agent into the environment.

As used herein, the terms "radiation curable resin" include all resin formulations that can be cured by exposure to a form of radiation. When the term "cured" is used herein, it refers to the curing of the resin to form a solid coating. In one embodiment, a film of liquid coating formulation reacts to form a durable solid coating. Most often, the curing reaction is a polymerization reaction, and the corrosion resistant coating often includes a matrix of crosslinked polymer chains.

The term "radiation", as used herein, refers to the method by which energy is transferred to the radiation curable resin in the coating formulation. Radiation curing can include energy transfer by ultraviolet (UV), visible light, electron beams, X-rays, gamma rays, plasmas, infrared, and microwaves. Further information regarding radiation curing can be found in Fouassier, J-P, *Photoinitiation, Photopolymerization, and Photocuring—Fundamentals and Applications*, Hanser Publishers, New York (1995); and *UV/EB Curing Primer: Inks, Coatings and Adhesives*, Rechel, C. J. (Ed.), RadTech International North America (Publ), (1995).

In one embodiment, the radiation curable resin is a UV curable resin.

In UV curable resin systems, it is common for the resin to include an oligomer, a photoinitiator, and optionally a monomeric diluent. Although many types of oligomers are useful in UV cured resin systems, those that are preferred include epoxy acrylates and diacrylates, urethane acrylates, polyurethane diacrylates, bisphenol A epoxy acrylates, amine modified polyether acrylates, aromatic urethane acrylates, polybutadiene acrylates, polyester acrylates, and mixtures thereof.

Examples of the photoinitiator for a UV curable resin system include First cure (DEAP, First Chemical Co.), Irgacure 651 (DMPA) Irgacure 184 (HCAP), Irgacure 784 (Titanocene derivative), Irgacure 369 (Morpholino ketone, BDMB), and Irgacure 907 (TPMK, from Ciba Geigy), Carocure 1173 (HAP), Darocure 1116 ((HAP derivative), DArocure 2959 (Hydrophilic HAP), and Darocure 953 ($C_{13}$-HAP, from Merck), Esacure KIP (oligomeric HAP, from Fratelli Lamberti), Lucirin TPO (trimethyl benzoyl phosphine oxide, from BASF), oligomeric alpha-hyroxyphenylketones, hydroxyacetophenones, and others described in Fouassier ibid. at 148. In a preferred embodiment, the photoinitiator comprises 2-hydroxy-2-methyl-phenyl-1-[4-(1-methylvinyl)phenyl] propanone.

In some UV curable resins, a monomeric diluent can also be present. Examples of such monomers include dipropylene glycol diacrylate, 1,3 butylene glycol diacrylate, ethoxylated trimethylolpropane triacrylate, propoxylated neopentyl glycol diacrylate, tripropylene glycol diacrylate, trimethylolpropane triacrylate, ditrimethylolpropane triacrylate, hexane diol diacrylate, and other monomers described in Fouassier, ibid at 149.

In a preferred embodiment, the UV-curable resin comprises a urethane acrylate oligomer/acrylate monomer blend. Examples of urethane acrylate oligomer/acrylate monomer blends that are preferred for the present invention are products having the tradenames FD3007C1UV, EXGH-MJG-CL, and EXGH-JH-CL, available from Allied PhotoChemical, Kimball, Mich.

In addition to the corrosion-responsive agent, the present radiation curable resin can also contain other ingredients, and such components as thermal free-radical inhibitors, additives for flow, slip, mist, wetting and dispersion control, plasticizing diluents, fillers, light stabilizers, pigments and dyes, and the like.

When the present compositions are applied to a metal surface, they can be applied by any technique, many of which are known in the art. Examples of application techniques include dip and wipe, curtain coating, roll coating, silk screen printing (screen printing), printing press, lithography, offset printing, nitrogen assisted airless spraying, brushing, flowing, pouring, or the like. Screen printing is a preferred method of applying the coating formulation to a metal surface when precise control of the coating thickness is desirable.

When the present coating formulations are applied to metal surfaces by screen printing, the metal can be coated in any screen printing apparatus and then cured in any UV curing machine. An example of a suitable UV curing machine is a Switchback UV curing system, available from M&R Printing Equipment, Inc., Glen Ellyn, Ill. When a film of the present coating formulation having as a radiation curable resin a urethane acrylate oligomer/acrylate monomer blend, such as FD3007C1UV, available from Allied PhotoChemical, Kimball, Mich., is applied to a metal surface, the film can be cured by exposure to radiation from an iron-doped UV lamp, having peak illumination at about 390 nm, with a power setting of 200 watts/inch and a belt speed of 10 feet per minute (fpm) to provide an illumination exposure to the film of the coating formulation of about 1.4 Joules/$cm^2$. When the coating formulation contains a polymerizable corrosion-responsive agent, such as DMcT, this combination of settings is suitable to cure a film of about 10 microns thickness. When non-polymerizable corrosion-responsive agents are used, thicker coatings, or faster belt speeds can be used.

When a film of the coating formulation is applied to a metal surface, the thickness of the film and the amount of corrosion-responsive agent in the coating formulation can be selected so that the amount of the corrosion-responsive agent is sufficient to provide a corrosion-protective level of the agent in the cured coating without interfering with the radiation curing of the resin in the film.

The corrosion-responsive agent can be present in the cured coatings of the present invention in any amount, but it is normal for the coating to contain the corrosion-responsive agent in an amount between 1% and 40% by weight. In a preferred embodiment, the corrosion-resisting coating comprises the corrosion-responsive agent in an amount between 2% and 25% by weight, and an amount between 3% and 10% by weight is even more preferred.

The cured corrosion-inhibiting coating of the present invention can have any thickness, but a thickness between about 5 and about 200 microns is normal. In preferred embodiments, the corrosion-inhibiting coating has a thickness between about 10 and about 100 microns, more preferred is a thickness between about 20 and about 60 microns, and yet more preferred is a thickness between about 25 and about 40 microns.

Also included in the present invention are anti-corrosion coating formulations. The present coating formulations comprise a radiation curable resin and a corrosion-responsive agent that is capable of releasing a corrosion-inhibiting ion in response to exposure to electrochemical (oxidation/reduction) conditions that are characteristic of those present on a metal surface undergoing oxidative corrosion. The corrosion-responsive agent of the formulation can be any one of the corrosion-responsive agents that are described above. Likewise, the radiation curable resin can be selected from any of the radiation curable resins that are described herein.

In a preferred coating formulation, the corrosion-responsive agent is 2,5-dimercapto-1,3,4-thiadiazole and the radiation curable resin comprises a urethane acrylate oligomer/acrylate monomer blend.

In an embodiment of the present coating formulation, at least a portion of the corrosion-responsive agent is a polymerizable corrosion-responsive agent.

The scope of the present invention also includes corrosion resisting coatings that are produced by curing the coating formulations that are described above. The corrosion resisting coatings comprise a corrosion-responsive agent dispersed in a radiation cured crosslinked polymer matrix. In some embodiments, at least a portion of the corrosion-responsive agent is present in the form of a homodimer or homopolymer of the corrosion-responsive agent, or as a copolymer with the radiation curable resin, and wherein the portion of the corrosion-responsive agent which is present in the form of a homodimer or homopolymer of the corrosion-responsive agent, or as a copolymer with the radiation curable resin is capable of de-polymerizing in response to exposure to electrochemical conditions characteristic of those present on a metal surface undergoing oxidative corrosion.

The present invention also includes metal surfaces that have been treated by the novel method. The metal surface that is protected against corrosion comprises a metal surface to which is adhered a radiation-cured polymer matrix that has been formed according to any one of the methods described herein.

It is believed that the present methods can be used to prevent or reduce corrosion for any corrodible metal. The methods and compositions are particularly useful on steel and aluminum alloys, and more particularly on aluminum/copper alloys. In preferred embodiments, the aluminum/copper alloys are those that comprise at least 1% by weight copper, more preferred are aluminum/copper alloys that contain at least 4% by weight copper, yet more preferred are copper-containing aluminum alloys AA2024 and AA7075.

The following examples describe preferred embodiments of the invention. Other embodiments within the scope of the claims herein will be apparent to one skilled in the art from consideration of the specification or practice of the invention as disclosed herein. It is intended that the specification, together with the examples, be considered to be exemplary only, with the scope and spirit of the invention being indicated by the claims which follow the examples. In the examples all percentages are given on a weight basis unless otherwise indicated.

EXAMPLE 1

This illustrates the production of poly(2,5-dimercapto-1,3,4-thiadiazole).

2,5-dimercapto-1,3,4-thiadiazole (25 grams, DMcT, available from Sigma-Aldrich, Milwaukee, Wis.) was added to 50/50 deionized water/methanol (1500 ml). Sodium hydroxide (6.66 grams) was then added to the mixture with stirring until the mixture became a clear transparent yellow. The mixture was heated to about 45° C. with stirring. In a separate flask, iodine (42.13 grams) was dissolved in methanol (400 ml) transferred to an addition funnel that is attached to the round-bottom flask holding the DMcT mixture. The iodine solution was added dropwise to the DMcT mixture in the flask with stirring over a period of about 30 minutes. A precipitate formed immediately and was initially white, but became reddish brown as the iodine solution was added. After stirring for 2 hours, the product was recovered by filtration, and the product was washed with acetonitrile, methanol and deionized water. The solid product was dried at 70° C. until dry. Product was a light yellow solid.

EXAMPLE 2

This illustrates the production of polyaniline doped with (2,5-dimercapto-1,3,4-thiadiazole).

Synthesis of DMcT-salt of polyaniline (Blender Method):

2,5-dimercapto-1,3,4-thiadiazole (93 grams) was ground in a mortar with a pestle to a fine powder. The powder was added to deionized water in a Waring blender and emulsified in the blender for 1 minute. Aniline (57 grams) was added to the mixture in the blender and emulsified for 1 minute. The mixture in the blender was transferred to a 3 liter round-bottom jacketed flask that was cooled to about 5° C. and blanketed with nitrogen. Ammonium peroxidisulfate (170 grams, APDS) was dissolved in deionized water and transferred to an addition funnel, which was attached to the round-bottom flask. The APDS solution was then added dropwise to the mixture in the flask over a period of about 15 minutes while maintaining the temperature of the mixture in the flask below about 5° C. The mixture was stirred for 3 hours at about 5° C. under a nitrogen blanket. The product was recovered by filtration, and the solid product was washed with deionized water.

Synthesis of DMcT-salt of polyaniline (Eiger Mill Method):

The following materials were added to an Eiger mill (Model Mini 100 Motormill, Eiger Machinery, Inc., Grayslake, Ill.): glass beads (60 ml), deionized water (325 ml), 2,5-dimercapto-1,3,4-thiadiazole (25 g, DMcT, CAS No. 1072-71-5). The charge was milled at 5000 rpm for about 15 minutes to produce a fine yellow slurry. Then aniline (15.32 g) was added dropwise over about 18 to 40 minutes, while the mill was operated at a speed of 5000 rpm. The mixture in the mill was milled an additional time period (up to 45 minutes) and then discharged from the mill.

The above procedure was repeated twice more and the three products of the procedure were combined and added to a 3 liter jacketed round-bottomed flask with an overhead stirrer. To the salt mixture was added dropwise 138 g ammonium peroxidisulfate (APS) in water at 2° C. The reaction exotherm of 13° C. was noted 77 minutes after the beginning of the APS addition. The dark-green-black slurry was stirred overnight at 2° C.

The slurry of fine particles was filtered, washed three times with 1000 ml deionized water, air dried, and then dried in a vacuum oven to give the product powder. The particles size by light microscopic examination was estimated to be less than about 20 microns.

Chromatographic Characterization of poly-DMcT and the DMcT-salt of polyaniline:

A sample of poly-DMcT, produced as described in Example 1, and two samples of the DMcT-salt of polyaniline (Pani-DMcT), produced separately by the first method described above, were characterized by size-exclusion chromatography (SEC) by methods described by Kinlen et al., in *Macromolecules*, 31:1735-1744 (1998). Polymer solutions used in the analysis were prepared in the SEC mobile phase (N-methylpyrrolidone (NMP) saturated with ammonium formate) at a nominal polymer concentration of 5 mg/ml. In the case of poly-DMcT and the two Pani-DMcT samples, only partial solubility was found. The solutions were centrifuged in a laboratory microcentrifuge at 8,000 rpm for 2 minutes. All insolubles sedimented under these conditions and only the soluble fractions were employed in the SEC analysis. The chromatographic flow rate was 0.4 ml/min and an injection volume of 400 microliters was used.

As shown in FIG. 1, the differential refractive index (DRI) chromatograms for the polyaniline standard (Sigma-Aldrich Co., St. Louis, Mo.) and the soluble fraction of poly-DMcT are distinctly different. The later retention time for the poly- DMcT is consistent with a low molecular weight polymer resulting from partial solubility (extraction) of the solid poly-DMcT in the SEC solvent.

Figure 2:
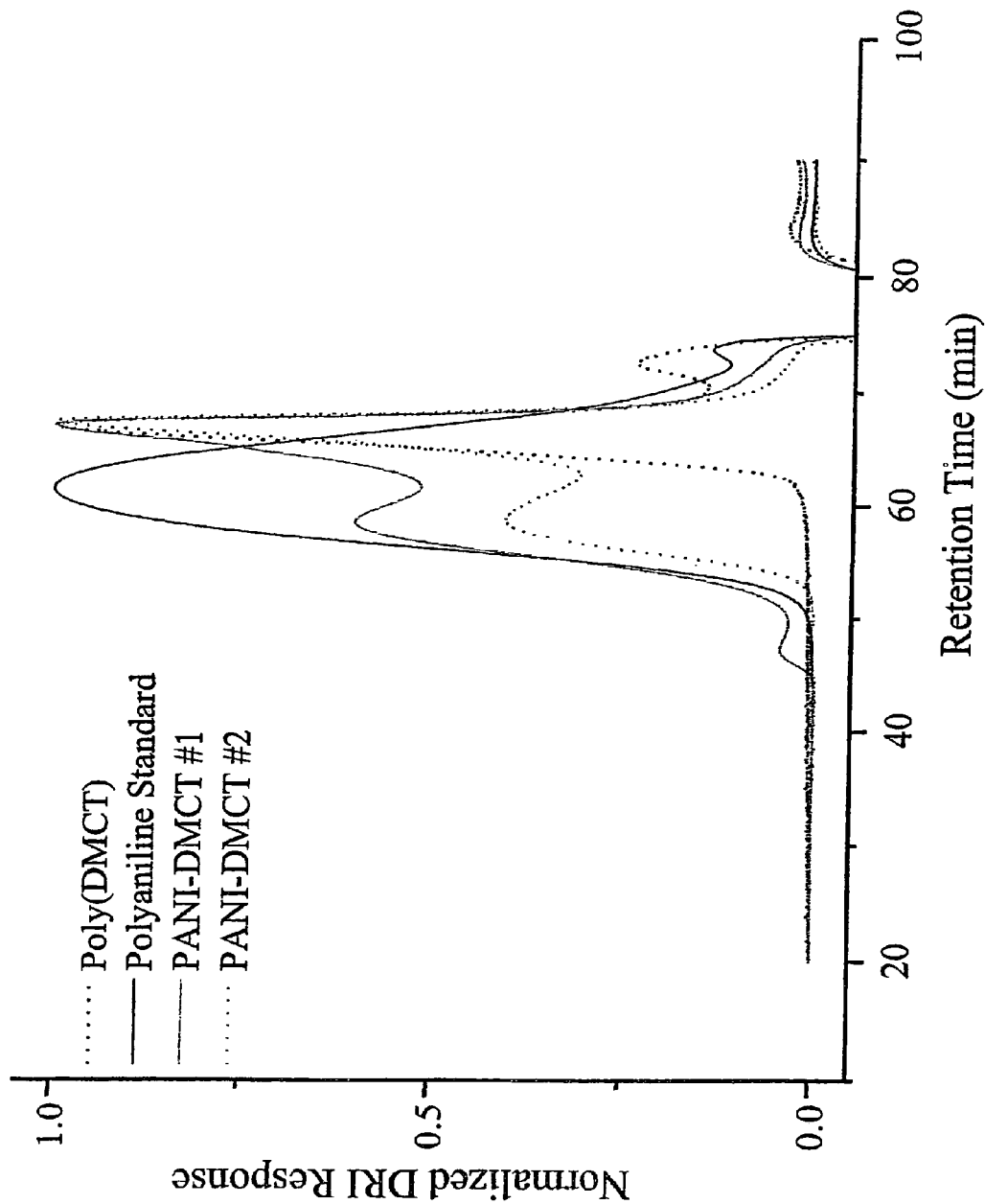
FIG. 2 shows an overlay the DRI curves for the two homopolymer standards shown in FIG. 1 with the corresponding curves for two separate samples of 2,5-dimercapto-1,3,4-thiadiazole salt of polyaniline (Pani-DMcT) labeled #1 and #2, and which indicates the presence of poly-DMcT, as well as the presence of polyaniline in each sample of Pani-DMcT.

Overlaying the DRI curves for the two homopolymer standards in FIG. 1, with the corresponding curves for the Pani-DMcT samples labeled #1 and #2, produced the data shown in FIG. 2. The chromatograms of Pani-DMcT #1 and #2 strongly indicate the presence of poly-DMcT, as well as the presence of polyaniline. Components eluting with retention times earlier than the polyaniline standard suggest multiple species, possibly pure polyaniline and copolymers of aniline and DMcT.

Figure 3:
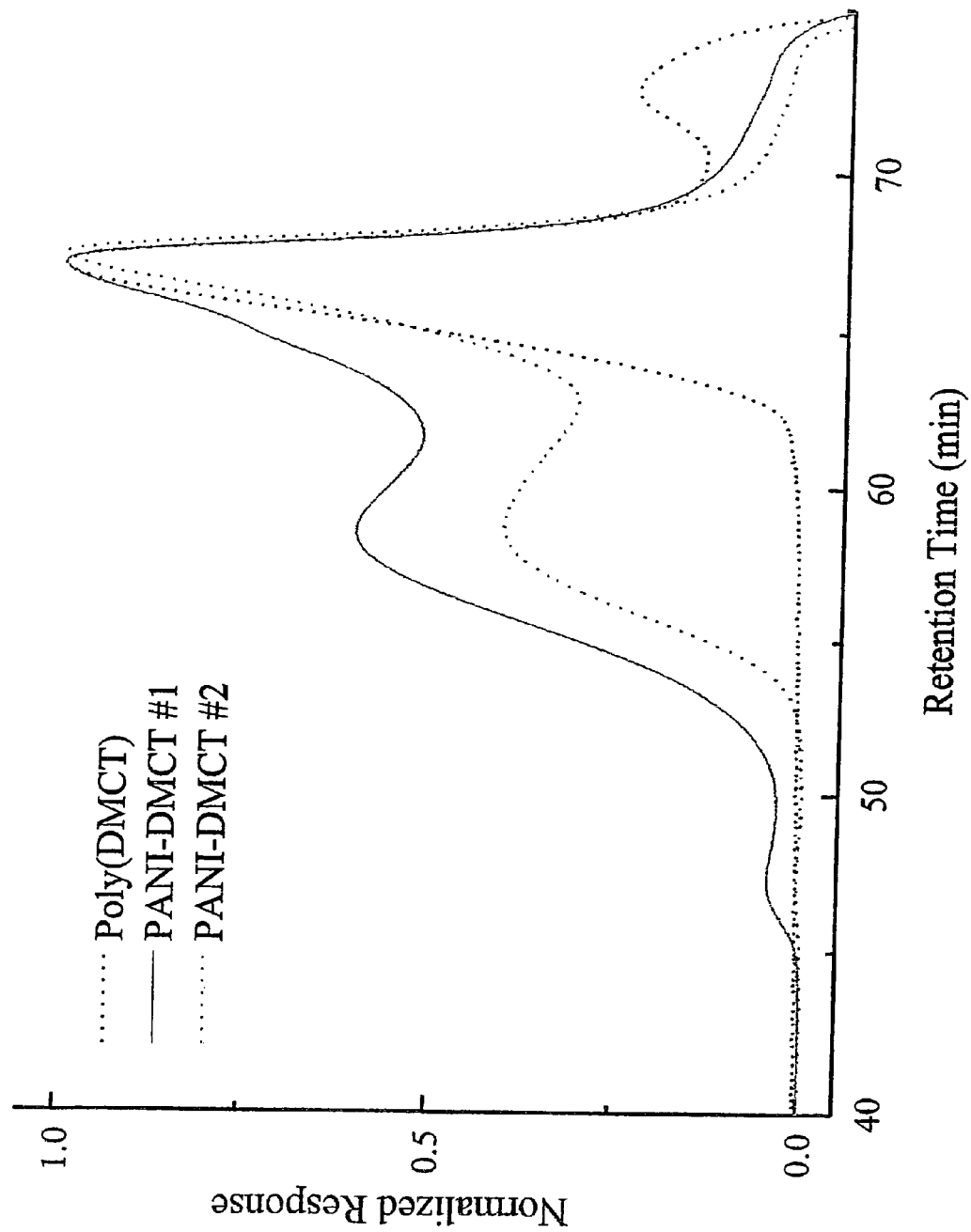
FIG. 3 is a retention time expansion of the polymer region of the chromatograms shown in FIG. 2, and shows components eluting with retention times earlier than the polyaniline standard, which suggests multiple species, possibly pure polyaniline and copolymers of aniline and DMcT, and also indicating poly-DMcT in the Pani-DMcT samples #1 and #2.
Figure 4:
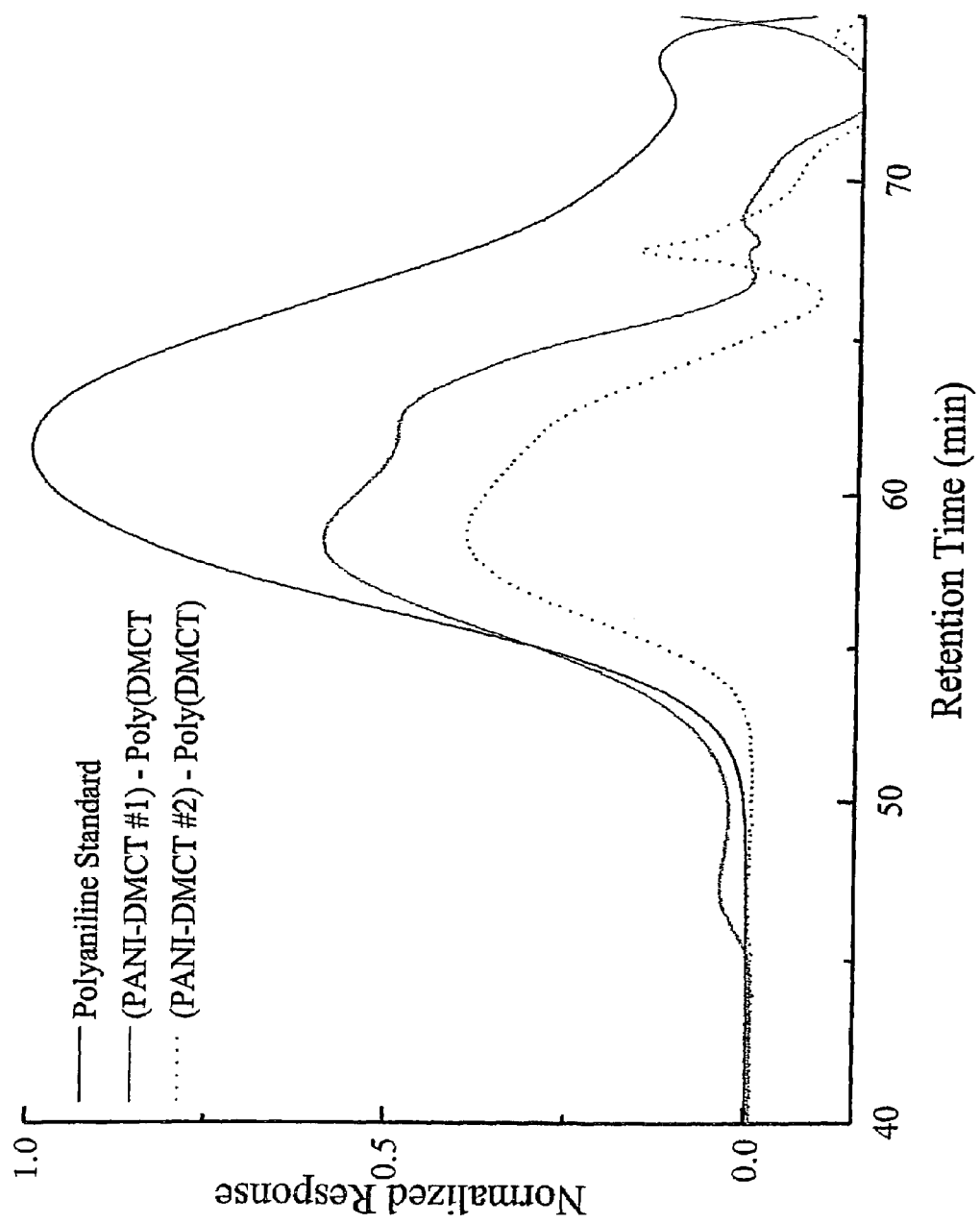
FIG. 4 is a normalized difference plot for Pani-DMcT vs. a polyaniline standard, which reveals that Pani-DMcT #1 contains less poly-DMcT relative to its earlier eluting components than in the case of Pani-DMcT #2.

The strong indication of poly-DMcT in Pani-DMcT samples #1 and #2 is clearly demonstrated in FIG. 3, which is a retention time expansion of the polymer region of the SEC chromatograms. By contrast, a similar expansion, shown in FIG. 4, reveals that Pani-DMcT #1 contains less poly-DMcT relative to its earlier eluting components than in the case of Pani-DMcT #2.

This data shows that polyaniline that is polymerized in the presence of DMcT provides a product having both polyaniline and poly-DMcT. The product may also have some types of DMcT dimers and oligomers, and even some types of co-polymers involving DMcT and aniline. These structures are believed to be important in providing the present cured coatings with the advantages of a low spontaneous release rate for the corrosion-inhibiting DMcT anion, while also providing a coating with a significant concentration of the corrosion-responsive agent.

EXAMPLE 3

This illustrates the production of UV-curable coating formulations containing (2,5-dimercapto-1,3,4-thiadiazole), poly(2,5-dimercapto-1,3,4-thiadiazole), and polyaniline doped with (2,5-dimercapto-1,3,4-thiadiazole).

A measured amount of a UV-curable resin (160 g; available as FD3007CI UV, from Allied PhotoChemical, Kimball, Mich.) was charged to an Eiger Mini Mill (Model 100 VSE; Eiger Machinery, Inc., Grayslake, Ill.), and an amount (17.78 g dry weight) of a corrosion-responsive agent, selected from 2,5-dimercapto-1,3,4-thiadiazole (DMcT), poly(2,5-dimercapto-1,3,4-thiadiazole), and polyaniline doped with (2,5-dimercapto-1,3,4-thiadiazole) (Pani-DMcT) was added as a solid material to the liquid to give a mixture that was 10% by weight corrosion-responsive agent. The solids and the liquid were milled until the solids were of the desired particle size and were well-dispersed in the liquid.

A known weight (100 g) of the 10% w/w mixture was drawn from the mill, and 77.78 g of the UV-curable resin was added to the mixture remaining in the mill to make a mixture that was 5% by weight DMcT, and the mixture in the mill was milled until the solids were well dispersed.

The 10% mixture and the 5% mixtures were then ready for use in the coating formulations of the invention. The relative amounts of UV-curable resin and corrosion-responsive agent can be varied to provide a coating formulation having any desirable concentration of the corrosion-responsive agent.

This method could be used with any radiation curable resin and any corrosion-responsive agent to prepare a UV-curable coating formulation of the present invention.

EXAMPLE 4

This illustrates the application of UV-cured coatings containing 2,5-dimercapto-1,3,4-thiadiazole, poly(2,5-dimercapto-1,3,4-thiadiazole), and polyaniline doped with (2,5-dimercapto-1,3,4-thiadiazole) to aluminum panels.

Coating formulations comprising a UV-curable resin (available as EXGH-JH-CL from Allied PhotoChemical Co.) containing 0%, 5%, and 10% w/w of either 2,5-dimercapto-1,3,4-thiadiazole, poly(2,5-dimercapto-1,3,4-thiadiazole), or polyaniline doped with (2,5-dimercapto-1,3,4-thiadiazole were applied onto one surface of 3"×6" aluminum panels selected from 2024 aluminum alloy, 2024 aluminum alloy cleaned by scrubbing with Scotch Brite®, or 7076 aluminum alloy to form the samples shown in Table 1. Each coating formulation was applied by screen printing in a Coleman press through a 305 mesh screen or a 380 mesh screen with an 80 dur. Squeegee. After the application of a film of the coating formulation had been applied to a panel, the coating film was cured by passage of the coated panel through an M&R Switchback UV curing system (Model CWBK-60-208-1-60, available from M&R Equipment Co., Glen Ellyn, Ill.) using a belt speed of 10 fpm and an intensity setting of 200 watts/in. (1.123 watts/cm$^2$) for an iron-doped lamp, to provide a power input of 1.346 Joules/cm$^2$ to the coated surface for each curing pass. Radiation power and exposure was measured with a High Energy UV Radiometer (available under the tradename UVICURE® Plus from EIT Inc., Sterling, Va.).

For each coating, a total of three coating/curing cycles was carried out. Coating weight and the thickness of the cured coating are shown in Table 1. Also shown in Table 1 is the coating density.

The cured coatings produced by this method had a final thickness of about 30-35 microns and a density of from about 0.005 to 0.006 lbs/mil/ft$^2$.

TABLE 1

Aluminum alloy samples with UV-cured corrosion-responsive coatings.

| Substrate[a] | Weight Before Coating (Gms) | Coating[b] | Mesh[c] | Passes[c] | Belt Speed[c] | Watts/inch[d] | Joules[e] | Weight After Coating | Coating Weight | Dry Film Thickness (Microns) | lbs/mil/ft2 |
|---|---|---|---|---|---|---|---|---|---|---|---|
| 2024-T3 CC | 25.81 | 10% DMcT | 305 | 3 | 10 | 1.164 | 1.398 | 26.17 | 0.36 | 35 | 0.0058 |
| 2024-T3 CC | 25.9 | 10% DMcT | 305 | 3 | 10 | 1.164 | 1.398 | 26.28 | 0.38 | 35 | 0.0062 |
| 2024-T3 CC | 25.44 | 10% DMcT | 305 | 3 | 10 | 1.164 | 1.398 | 25.81 | 0.37 | 34 | 0.0062 |
| 2024-T3 CC | 25.46 | 10% DMcT | 305 | 3 | 10 | 1.164 | 1.398 | 25.83 | 0.37 | 34 | 0.0062 |
| 2024-T3 CC | 25.73 | 10% PolyDMcT | 305 | 3 | 10 | 1.164 | 1.398 | 26.07 | 0.34 | 35 | 0.0055 |

TABLE 1-continued

Aluminum alloy samples with UV-cured corrosion-responsive coatings.

| Substrate[a] | Weight Before Coating (Gms) | Coating[b] | Mesh[c] | Passes[c] | Belt Speed[c] | Watts/inch[d] | Joules[e] | Weight After Coating | Coating Weight | Dry Film Thickness (Microns) | lbs/mil/ft2 |
|---|---|---|---|---|---|---|---|---|---|---|---|
| 2024-T3 CC | 25.44 | 10% PolyDMcT | 305 | 3 | 10 | 1.164 | 1.398 | 25.8 | 0.36 | 34 | 0.0060 |
| 2024-T3 CC | 25.73 | 10% PolyDMcT | 305 | 3 | 10 | 1.164 | 1.398 | 26.08 | 0.35 | 36 | 0.0055 |
| 2024-T3 CC | 25.71 | 10% PolyDMcT | 305 | 3 | 10 | 1.164 | 1.398 | 26.05 | 0.34 | 35 | 0.0055 |
| 2024-T3 CC | 25.77 | 10% PANI-DMcT | 380 | 3 | 10 | 1.164 | 1.398 | 26.02 | 0.25 | 26 | 0.0055 |
| 2024-T3 CC | 25.69 | 10% PANI-DMcT | 380 | 3 | 10 | 1.164 | 1.398 | 25.96 | 0.27 | 28 | 0.0055 |
| 2024-T3 CC | 25.58 | 10% PANI-DMcT | 380 | 3 | 10 | 1.164 | 1.398 | 25.83 | 0.25 | 27 | 0.0053 |
| 2024-T3 CC | 25.67 | 10% PANI-DMcT | 380 | 3 | 10 | 1.164 | 1.398 | 25.93 | 0.26 | 27 | 0.0055 |
| 2024-T3 CC | 25.7 | Allied Clear | 305 | 3 | 10 | 1.164 | 1.398 | 26.01 | 0.31 | 33 | 0.0053 |
| 2024-T3 CC | 25.74 | Allied Clear | 305 | 3 | 10 | 1.164 | 1.398 | 26.05 | 0.31 | 32 | 0.0055 |
| 2024-T3 Scotch Brite | 25.81 | 10% DMcT | 305 | 3 | 10 | 1.164 | 1.398 | 26.18 | 0.37 | 35 | 0.0060 |
| 2024-T3 Scotch Brite | 25.79 | 10% DMcT | 305 | 3 | 10 | 1.164 | 1.398 | 26.16 | 0.37 | 35 | 0.0060 |
| 2024-T3 Scotch Brite | 25.8 | 10% DMcT | 305 | 3 | 10 | 1.164 | 1.398 | 26.17 | 0.37 | 35 | 0.0060 |
| 2024-T3 Scotch Brite | 25.88 | 10% DMcT | 305 | 3 | 10 | 1.164 | 1.398 | 26.25 | 0.37 | n/a | n/a |
| 2024-T3 Scotch Brite | 25.76 | 10% PolyDMcT | 305 | 3 | 10 | 1.164 | 1.398 | 26.12 | 0.36 | 34 | 0.0060 |
| 2024-T3 Scotch Brite | 25.52 | 10% PolyDMcT | 305 | 3 | 10 | 1.164 | 1.398 | 25.87 | 0.35 | 34 | 0.0059 |
| 2024-T3 Scotch Brite | 25.87 | 10% PolyDMcT | 305 | 3 | 10 | 1.164 | 1.398 | 26.22 | 0.35 | 34 | 0.0059 |
| 2024-T3 Scotch Brite | 25.78 | 10% PolyDMcT | 305 | 3 | 10 | 1.164 | 1.398 | 26.16 | 0.38 | n/a | n/a |
| 2024-T3 Scotch Brite | 25.8 | 10% PANI-DMcT | 380 | 3 | 10 | 1.164 | 1.398 | 26.05 | 0.25 | 26 | 0.0055 |
| 2024-T3 Scotch Brite | 25.79 | 10% PANI-DMcT | 380 | 3 | 10 | 1.164 | 1.398 | 26.04 | 0.25 | 26 | 0.0055 |
| 2024-T3 Scotch Brite | 25.68 | 10% PANI-DMcT | 380 | 3 | 10 | 1.164 | 1.398 | 25.96 | 0.28 | 27 | 0.0059 |
| 2024-T3 Scotch Brite | 25.71 | 10% PANI-DMcT | 380 | 3 | 10 | 1.164 | 1.398 | 25.98 | 0.27 | n/a | n/a |
| 2024-T3 Scotch Brite | 25.79 | Allied Clear | 305 | 3 | 10 | 1.164 | 1.398 | 26.12 | 0.33 | 38 | 0.0049 |
| 2024-T3 Scotch Brite | 25.79 | Allied Clear | 305 | 3 | 10 | 1.164 | 1.398 | 26.1 | 0.31 | n/a | n/a |
| 7075-T6 CC | 26.11 | 10% DMcT | 305 | 3 | 10 | 1.164 | 1.398 | 26.46 | 0.35 | 34 | 0.0059 |
| 7075-T6 CC | 25.96 | 10% DMcT | 305 | 3 | 10 | 1.164 | 1.398 | 26.33 | 0.37 | 33 | 0.0064 |
| 7075-T6 CC | 26.09 | 10% DMcT | 305 | 3 | 10 | 1.164 | 1.398 | 26.46 | 0.37 | 37 | 0.0057 |
| 7075-T6 CC | 26.13 | 10% DMcT | 305 | 3 | 10 | 1.164 | 1.398 | 26.49 | 0.36 | 36 | 0.0057 |
| 7075-T6 CC | 26.16 | 10% PolyDMcT | 305 | 3 | 10 | 1.164 | 1.398 | 26.53 | 0.37 | 36 | 0.0058 |
| 7075-T6 CC | 26.13 | 10% PolyDMcT | 305 | 3 | 10 | 1.164 | 1.398 | 26.5 | 0.37 | 34 | 0.0062 |
| 7075-T6 CC | 26.18 | 10% PolyDMcT | 305 | 3 | 10 | 1.164 | 1.398 | 26.53 | 0.35 | 33 | 0.0060 |
| 7075-T6 CC | 26.18 | 10% PolyDMcT | 305 | 3 | 10 | 1.164 | 1.398 | 26.53 | 0.35 | 33 | 0.0060 |
| 7075-T6 CC | 26.18 | 10% PANI-DMcT | 380 | 3 | 10 | 1.164 | 1.398 | 26.43 | 0.25 | 28 | 0.0051 |
| 7075-T6 CC | 26.12 | 10% PANI-DMcT | 380 | 3 | 10 | 1.164 | 1.398 | 26.39 | 0.27 | 26 | 0.0059 |
| 7075-T6 CC | 26.02 | 10% PANI-DMcT | 380 | 3 | 10 | 1.164 | 1.398 | 26.27 | 0.25 | 25 | 0.0057 |
| 7075-T6 CC | 26.13 | 10% PANI-DMcT | 380 | 3 | 10 | 1.164 | 1.398 | 26.39 | 0.26 | 25 | 0.0059 |
| 7075-T6 CC | 26.13 | Allied Clear | 305 | 3 | 10 | 1.164 | 1.398 | 26.46 | 0.33 | 31 | 0.0061 |
| 7075-T6 CC | 26.12 | Allied Clear | 305 | 3 | 10 | 1.164 | 1.398 | 26.43 | 0.31 | 31 | 0.0057 |

Notes:
[a]Substrates are 2024 aluminum alloy, 2024 aluminum alloy cleaned with Scotch Brite ® cleanser, and 7075 aluminum alloy.
[b]Coatings show the percent w/w of the corrosion-responsive agent present in a UV-curable resin (EXGH-JH-CL from Allied - - - ). Samples shown as "Allied clear" have no corrosion-responsive agent.
[c]The mesh size shown in the mesh size of the screen used for screen printing of the coating. "Passes" denote the number of separate coating/curing cycles used to
[d]Watts/in is the power setting for the iron-doped UV lamp, and Joules show the power transferred to the coating during each curing pass.

EXAMPLE 5

This illustrates the anti-corrosion performance of aluminum panels coated with UV-cured coatings containing (2,5-dimercapto-1,3,4-thiadiazole), poly(2,5-dimercapto-1,3,4-thiadiazole), and polyaniline doped with (2,5-dimercapto-1,3,4-thiadiazole) in salt-fog tests.

Samples of aluminum alloy (3"×6"×0.032" bare 2024 T3 aluminum alloy) were pretreated with a chromate conversion coating according to Military Specification MIL-C-5541/ PS13209, and then coated with the coatings described in Table 2 and subjected to salt/fog exposure testing according to ASTM B-117 test protocol. Each test panel was scribed to produce a scratch that penetrated the coating and uncovered the bare aluminum alloy. Table 2 shows the performance of the samples after 1,560 hours of salt/fog exposure. It can be seen that all test panels having either polyaniline/DMcT or DMcT corrosion-responsive agents as components of the coatings were significantly protected against corrosion.

TABLE 2

Salt/fog testing of aluminum alloy coated with coatings containing corrosion-responsive agents.

| PANEL NO. | COATING TYPE | COATING METHOD | NO. OF DRY PASSES | DRY FILM THICKNESS (microns) | CORROSION PERFORMANCE AT 1560 HOURS |
|---|---|---|---|---|---|
| 8C | 7.5% PANI/DMcT IN EXGH-AAJG-CL | #10 Wire draw bar | 2 | 32 | Single blister growing in circumference |
| 9C | Same | Same | 2 | 35 | No change |
| 1C | Same | Same | 2 | 32 | Blister next to scratch growing |
| 8D | 7.5% PANI/DMcT in EXGH-JH-CL | ATM screen printing | 3 | 32 | No change |
| 9D | Same | Same | 3 | 33 | Blister next to scratch growing |
| 10D | Same | Same | 3 | 32 | Blister next to scratch growing |
| 8E | 7.5% DMcT IN EXGH-AAJG-CL | #10 Wire draw bar | 2 | 31 | No change |
| 9E | Same | Same | 2 | 34 | No change |
| 10E | Same | Same | 2 | 30 | No change |
| 8F | 7.5% PANI/DMcT in EXGH-JH-CL | ATM screen printing | 3 | 33 | No change |
| 9F | Same | Same | 3 | 32 | No change |
| 10F | Same | Same | 3 | 33 | No change |

All references cited in this specification, including without limitation all papers, publications, patents, patent applications, presentations, texts, reports, manuscripts, brochures, books, internet postings, journal articles, periodicals, and the like, are hereby incorporated by reference into this specification in their entireties. The discussion of the references herein is intended merely to summarize the assertions made by their authors and no admission is made that any reference constitutes prior art. Applicants reserve the right to challenge the accuracy and pertinency of the cited references.

In view of the above, it will be seen that the several advantages of the invention are achieved and other advantageous results obtained.

As various changes could be made in the above methods and compositions without departing from the scope of the invention, it is intended that all matter contained in the above description and shown in the accompanying drawings shall be interpreted as illustrative and not in a limiting sense.

What is claimed is:

1. A method of producing an intrinsically conductive polymer salt of a corrosion-responsive agent, the method comprising:

(a) subjecting a liquid mixture containing a corrosion-responsive agent chosen from one or more of 1-(4-hydroxyphenyl)-1H-tetrazol-5-thiol, 1,2,4-triazole-3-thiol, 1-pyrollidinecarbodithioic acid, 2,2'-dithiobis(benzothiazole), 2,4-dimercapto-6-amino-5-triazine, 2,4-dithiohydantoin, 2,5-dimercapto-1,3,4-thiadiazole, 2,5-dimethylbenzothiazole, 2-amino-1,3,4-thiadiazole, 2-mercapto-5-methylbenzimidazole, 2-mercapto-5-nitrobenzimidazole, 2-mercaptobenzimidizole, 2-mercaptobenzoxazole, 2-mercaptoethane sulfonic acid, 2-mercaptoimidazole, 2-mercaptothiazoline, 2-thiouracil, 3-amino-5-mercapto-1,2,4- triazole, 5,5-dithiobis(1,3,4-thiadiazole-2(3H)-thione, 5-amino-1,3,4-thiadiazole, 6-amino-2-mercaptobenzothiazole, 6-ethoxy-2-mercaptobenzothiazole, 6-mercaptopurine, -alky- or N-cycloalkyl-dithiocarbamates, alkyl- and cyclo-alkyl mercaptanes, benzothiazole, dimercapto pyridine, dimethyldithio carbamic acid, dithiocyanuric acid, mercaptobenzothiazole, mercaptobenzoxazole, mercaptoethanesulfonic acid, mercaptoimidazole, mercaptopyridine, mercaptopyrimidine, mercaptopuinoline, mercaptothiazole, mercaptothiazoline mercaptotriazole, O,O-dialkyl- and O,O-dicycloalkyl-dithiophosphates, O-alkyl- or O-cycloalkyl-dithiocarbonates, o-ethylxanthic acid, quinoxaline-2,3-thiol, thioacetic acid, thiocresol, thiosalicylic acid, trithiocyanuric acid, and dimers, trimers, oligomers, and polymers thereof, to high-shear mixing to separate the corrosion-responsive agent into very fine particles;

(b) adding a monomer of an intrinsically conductive polymer to the mixture of fine corrosion-responsive agent particles while subjecting the mixture to high-shear mixing;

(c) adding an oxidant to the mixture to facilitate polymerization of the monomer of the intrinsically conductive polymer into an intrinsically conductive polymer which is doped by the corrosion-responsive agent to form the ICP/CRA salt; and (d) recovering the ICP/CRA salt.

2. The method according to claim 1, wherein the polymerization of the monomer of the intrinsically conductive polymer is carried out in the presence of a corrosion-responsive agent and an acid that is not a corrosion-responsive agent, wherein the molar ratio of total acids to corrosion-responsive agent is lower than 8:1.

3. The method according to claim 2, wherein the molar ratio of total acids to corrosion-responsive agent is lower than 2:1.

4. The method according to claim 2, wherein the polymerization is carried out in a medium that is free of an acid other than the corrosion-responsive agent.

5. The method according to claim 1, wherein the monomer of an intrinsically conductive polymer is chosen from one or more of aniline, pyrrole, and thiophene.

* * * * *

UNITED STATES PATENT AND TRADEMARK OFFICE
CERTIFICATE OF CORRECTION

PATENT NO. : 7,601,280 B2  Page 1 of 1
APPLICATION NO. : 12/217699
DATED : October 13, 2009
INVENTOR(S) : Patrick J. Kinlen It is certified that error appears in the above-identified patent and that said Letters Patent is hereby corrected as shown below:

Title Page, Item (56)

The following references should be listed under References Cited, U.S. Patent Documents on Page 2 of the issued patent after "6,447,594 B1 9/2002 Sinko et al. .......... 106/453":

-- 6,403,826 B1 06/2002 Braig et al. ................. 562/12
5,980,619 11/1999 Braig et al. ................. 106/14.12 --

The following references should be listed under References Cited, Foreign Patent Documents on Page 2 of the issued patent after "WO WO 90/10095 9/1990":

-- JP 2002-80511 03/2002
JP 9-227802 09/1997
JP Hei 9-363185 06/1999
JP Hei 2-162205 02/1992
JP Sho 51-14950 08/1997
JP Sho 45-121999 03/1974 --

The following reference should be listed under References Cited, Other Publications on Page 2 of the issued patent after "Book by Fulvio Vara, et al. entitled UV/EB Curing Primer: Inks, Coatings and Adhesives, Rad Tech International North America, Jan. 1995; pp. 1-17; 60-69.":

-- Boshoku Gijutsu Binran (Handbook of Corrosion Proofing) 1986, pp. 652-668. --

Signed and Sealed this

Twenty-second Day of December, 2009

David J. Kappos
*Director of the United States Patent and Trademark Office*